Patented Aug. 2, 1949

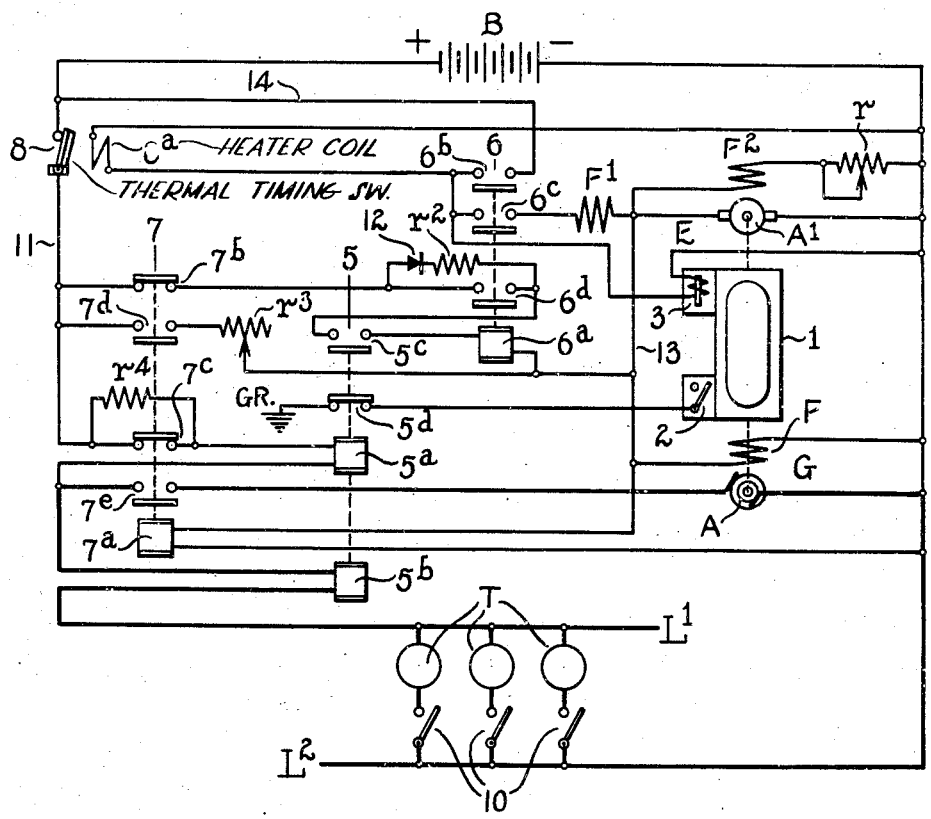

2,477,714

UNITED STATES PATENT OFFICE 2,477,714

ELECTRIC GENERATING SYSTEM

Walter O. Baer, Milwaukee, Wis., assignor to Cutler-Hammer, Inc., Milwaukee, Wis., a corporation of Delaware Application December 1, 1947, Serial No. 789,096

3 Claims. (Cl. 290—30)

This invention relates to electric generating systems.

The invention relates more particularly to controllers for electric generating plants of the type including a generator which is driven by an internal combustion engine to supply service mains with current at a relatively high voltage such as 110 volts and an exciter which is coupled to the engine and acts as a motor when supplied with current from a low voltage source such as a storage battery to effect cranking of the engine and which also acts when the engine becomes self-operative to excite the generator and effect charging of the storage battery.

My prior Patent No. 2,179,680, issued November 14, 1939, discloses a controller for generating plants of the aforesaid type including a control switch which operates to establish a cranking circuit for the exciter when there is a demand for current on the service mains. This cranking control switch in responding is subjected to control by current conditions in the motoring circuit to provide for opening thereof when the engine becomes self-operative. However, it has been found that where the generating plant is provided with an exciter of relatively high voltage and a battery of relatively low voltage, as for example a 24 volt battery and a 48 volt exciter, the cranking control switch of the aforesaid patent will reclose when the engine of the plant becomes self-operative and thereby prevent proper functioning of the plant.

The present invention has among its objects to provide a control system for generating plants of the aforesaid type having improved cranking control means which overcomes the aforementioned objection.

Another object is to provide an improved control system for generating plants of the aforesaid type including simple and effective means for insuring against reclosure of the cranking circuit for the exciter when the plant becomes self-operative.

Various other objects and advantages of the invention will hereinafter appear.

The accompanying drawing diagrammatically illustrates an embodiment of the invention which will now be described, it being understood that the embodiment illustrated is susceptible of modification without departing from the spirit and scope of the appended claims.

Referring to the drawing, the same illustrates an electric generating plant including a single phase alternating current generator G for supplying current to service mains $L^1$, $L^2$, an exciter E for said generator and an internal combustion engine I for driving said generator and exciter, said engine being provided with the usual magneto 2 and an electromagnetically operated choke 3. Generator G is provided with an armature A and a field winding F and exciter E is provided with an armature $A^1$, a starting series field winding $F^1$ and a shunt field winding $F^2$. As illustrated field winding F of the generator is permanently connected across armature $A^1$ of the exciter and the strength of field winding $F^2$ of the exciter is regulated by an adjustable resistance $r$. As hereinafter set forth, when there is a demand for current on the service mains $L^1$, $L^2$ exciter E is automatically connected to a storage battery B to provide for operation thereof as a motor for cranking of the engine, and when the engine becomes self-operative said exciter is automatically connected to the storage battery to charge the same. Also as hereinafter set forth generator G is normally disconnected from the service mains $L^1$, $L^2$ and is automatically connected thereto when the engine is brought up to substantially normal speed.

The control means for the aforedescribed generating plant includes a load relay 5, a cranking contactor 6, a generator contactor 7 and a timing switch 8. Load relay 5 is provided with a pickup coil $5^a$ and a holding coil $5^b$, and the same is also provided with normally open contacts $5^c$ and normally closed contacts $5^d$. Cranking contactor 6 is provided with an operating coil $6^a$ and normally open contacts $6^b$, $6^c$ and $6^d$. Generator contactor 7 is provided with an operating coil $7^a$, normally closed contacts $7^b$ and $7^c$ and normally open contacts $7^d$ and $7^e$. Timing switch 8 is of a conventional type, the same being normally held in closed position and having a heater $8^a$ associated therewith which operates when energized for a predetermined interval to effect opening thereof.

The operation of the aforedescribed control means and also the circuit connections therefor will now be more fully described. As shown in the drawing, a plurality of translating devices T are connected to service main $L^1$ and each of said translating devices has a switch 10 associated therewith for connecting the same to service main $L^2$. Upon closure of any one of the switches 10 load relay 5 is energized by a circuit extending from the positive terminal of battery B through timing switch 8 to conductor 11, through contacts $7^c$ of generator contactor 7, through load relay coils $5^a$ and $5^b$ to line $L^1$ and thence through the translating device T associated with the closed switch 10 to service main $L^2$ which is permanently connected to the negative terminal of battery B. Load relay 5 then responds under the action of both of its coils $5^a$ and $5^b$ and upon response thereof contacts $5^d$ are opened to disconnect magneto 2 from a ground GR, and contacts $5^c$ are closed to establish an energizing circuit for response of cranking contactor 6. This energizing circuit extends from the positive terminal of battery B through timing switch 8 to conductor 11, through contacts $7^b$ of generator contactor 7, through a rectifier 12 and a resistance $r^2$ to load relay contacts $5^c$, through cranking contactor coil $6^a$ to conductor 13 and through armature $A^1$ of exciter E to the negative terminal of battery B. Since exciter E is stationary at this time cranking contactor coil $6^a$ is subjected to substantially full battery voltage. For a purpose hereinafter set forth coil $6^a$ is of low resistance and in order to prevent excessive current therein prior to starting of exciter E resistance $r^2$ is temporarily included in the energizing circuit for said coil.

Upon response of cranking contactor 6 a cranking circuit for exciter E is established from the positive terminal of battery B by conductor 14 through cranking contactor contacts $6^b$ and $6^c$, through series field winding $F^1$ of the exciter and in parallel through armature $A^1$ and shunt field winding $F^2$ of the exciter to the negative terminal of battery B. Also heater coil $8^a$ of timing switch 8 and the electromagnetic choke 3 are connected across the terminals of battery B by cranking contactor contacts $6^b$. Exciter E then acts as a motor to effect cranking of engine 1. However, if the engine fails to fire after being cranked for a predetermined interval, as for example one minute, timing switch 8 responds under the action of its heater coil $8^a$ to interrupt the aforedescribed energizing circuits for load relay 5 and cranking contactor 6 for stopping of exciter E.

Relay 6 in responding closes its contacts $6^d$ to shunt rectifier 12 and resistance $r^2$, and the operating coil $6^a$ of cranking contactor 6 is then connected directly across the terminals of starting field winding $F^1$ of the exciter by a circuit extending from the left hand terminal of said field winding through cranking contactor contacts $6^c$ and $6^b$, by conductor 14 through timing switch 8, through generator contactor contacts $7^b$, cranking contactor contacts $6^d$ and load relay contacts $5^c$, to and through the operating coil $6^a$ to the right hand terminal of said field winding. The current in cranking contactor $6^a$ is then determined by the voltage drop across starting field winding $F^1$ of the exciter. When exciter E is brought up to maximum cranking speed the voltage drop across field winding $F^1$ is usually less than 5% of the battery voltage, and coil $6^a$ is made of low resistance to prevent dropping out of cranking contactor 6 at this voltage value. However, upon starting of engine 1 the voltage across field winding $F^1$ of the exciter drops to zero but before this point is reached the current in coil $6^a$ drops to a value which permits dropping out of cranking contactor 6. Upon dropping out of cranking contactor 6 contacts $6^b$ and $6^c$ are opened to interrupt the aforedescribed cranking circuit for exciter E and the energizing circuits for electromagnetic choke 3 and heater coil $8^a$ of timing switch 8 are interrupted by opening of contacts $6^b$. Also, rectifier 12 and resistance $R^2$ are reincluded in the aforedescribed energizing circuit for operating coil $6^a$ of the cranking contactor.

Inclusion of rectifier 12 in the energizing circuit of coil $6^a$ insures against reclosure of cranking contactor 6 after the plant has started to run. Thus assuming that the plant is provided with a 48 volt exciter and a 24 volt battery it is apparent that when the engine begins operating there is a wide difference in potential between the battery and the exciter which tends to cause a reversed current flow in the energizing circuit of cranking contactor coil $6^a$. However, rectifier 12 prevents reversal of the current in coil $6^a$ so that cranking contactor 6 cannot reclose when the plant starts to operate.

It will be noted that the operating winding $7^a$ of generator contactor 7 is permanently connected across the terminals of armature $A^1$ of exciter E. Assuming that the system is provided with a 48 volt exciter, operating coil $7^a$ may be designed to effect response of generator contactor 7 when the exciter voltage reaches a predetermined high value, as for example 40 volts. Upon response of generator contactor 7, contacts $7^e$ thereof are closed to connect generator G across service mains $L^1$, $L^2$, and contacts $7^d$ thereof are closed to establish a charging circuit from the positive terminal of battery B to the left hand terminal of armature $A^1$ of exciter E, such circuit including the usual charge regulating resistance $r^3$. Also upon response of generator contactor 7, contacts $7^b$ thereof are opened to interrupt the aforedescribed energizing circuit for cranking contactor coil $6^a$ and contacts $7^c$ thereof are opened to include a resistance $r^4$ in the energizing circuit for holding coil $5^a$ of load relay 5. Load relay 5 is then held against return to normal position by current from generator G which passes through the holding coil $5^b$.

The plant now continues to run to effect charging of battery B and to supply current to the supply mains $L^1$, $L^2$. However, upon opening of all of the control switches 10 the load across the service mains $L^1$, $L^2$ is removed and holding coil $5^b$ of load relay 5 is deenergized to permit said relay to drop out. Upon dropping out of load relay 5 magneto 2 is grounded by contacts $5^d$ of said relay for stopping of engine 1 and operating coil $7^a$ is deenergized for dropping out of generator contactor 7. The control means is now in condition to provide for restarting of the generating plant when there is demand for current across the service mains $L^1$, $L^2$.

What I claim as new and desire to secure by Letters Patent is:

1. In an electric generating system, a generator, service mains to be supplied thereby, an internal combustion engine for driving said generator, an exciter for said generator to be driven by said engine and adapted to act as a motor to crank the same, a storage battery, a normally open electromagnetic starting switch for establishing a motoring circuit for said exciter from said storage battery, a relay responsive upon current demand across said service mains to establish an energizing circuit for said starting switch from said battery, said starting switch when closed being subjected to control by current conditions in said motoring circuit to provide for opening thereof upon starting of said engine, and a rectifier connected in the energizing circuit of said starting switch to prevent reclosure of the latter upon starting of said engine.

2. In an electric generating system, a generator, service mains to be supplied thereby, an internal combustion engine for driving said generator, an exciter for said generator to be driven by said engine and adapted to act as a motor to crank the same, a storage battery, a normally open cranking contactor for establishing a motoring circuit for said exciter from said storage battery, an operating winding for closing said contactor, a relay responsive upon current demand across said service mains to establish an energizing circuit for said operating winding from said battery for closure of said contactor, said operating winding upon closure of said contactor being subjected to control by current conditions in said motoring circuit to provide for opening of said contactor upon starting of said engine and a rectifier connected in the energizing circuit of said operating winding to prevent reclosure of said contactor upon starting of said engine, said rectifier permitting passage of current in one direction through said winding during motoring operation of said exciter and preventing passage of current in a reverse direction through said winding during generative operation of said exciter.

3. In an electric generating system, a generator, service mains to be supplied thereby, an internal combustion engine for driving said generator, an exciter for said generator to be driven by said engine and adapted to act as a motor to crank the same, said exciter being provided with a starting field winding, a storage battery, a normally open cranking contactor for establishing a motoring circuit for said exciter from said storage battery, including said field winding, an operating winding of low resistance for closing said contactor, a relay responsive upon current demand across said service mains to establish an energizing circuit for said operating winding from said battery for closure of said contactor, said operating winding upon closure of said contactor being connected in shunt with said field winding to provide for opening of said contactor upon starting of said engine, a rectifier normally connected in the energizing circuit of said operating winding to prevent reclosure of said contactor upon starting of said engine, said rectifier permitting passage of current in one direction through said winding during motoring operation of said exciter and preventing passage of current in a reverse direction through said winding during generative operation of said exciter, and means for excluding said rectifier from the energizing circuit of said winding upon closure of said contactor.

WALTER O. BAER.

REFERENCES CITED

The following references are of record in the file of this patent:

UNITED STATES PATENTS

| Number | Name | Date |
|---|---|---|
| 1,447,480 | Matthews | Mar. 6, 1923 |
| 1,704,996 | Witzel | Mar. 12, 1929 |
| 1,773,913 | Loehr et al. | Aug. 26, 1930 |
| 1,842,509 | Dickey | Jan. 26, 1932 |
| 1,869,846 | Frank | Aug. 2, 1932 |
| 2,033,364 | Wertz | Mar. 10, 1936 |
| 2,071,826 | Frank | Feb. 23, 1937 |
| 2,078,980 | Sola | May 4, 1937 |
| 2,085,072 | Bobe | June 29, 1937 |
| 2,179,680 | Baer et al. | Nov. 14, 1939 |
| 2,384,135 | Scherry | Sept. 4, 1945 |